US011262995B2

(12) United States Patent
Zou

(10) Patent No.: US 11,262,995 B2
(45) Date of Patent: Mar. 1, 2022

(54) METHOD AND APPARATUS FOR DOWNLOADING INSTALLATION-FREE APPLICATION

(71) Applicant: HUAWEI TECHNOLOGIES CO., LTD., Guangdong (CN)

(72) Inventor: Xianjun Zou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/980,474

(22) PCT Filed: Jul. 24, 2018

(86) PCT No.: PCT/CN2018/096892
§ 371 (c)(1),
(2) Date: Sep. 14, 2020

(87) PCT Pub. No.: WO2019/184156
PCT Pub. Date: Oct. 3, 2019

(65) Prior Publication Data
US 2021/0019130 A1    Jan. 21, 2021

(30) Foreign Application Priority Data

Mar. 28, 2018 (CN) .......................... 201810265173.4

(51) Int. Cl.
*G06F 8/60* (2018.01)
*G06F 9/445* (2018.01)

(52) U.S. Cl.
CPC .............. *G06F 8/60* (2013.01); *G06F 9/445* (2013.01)

(58) Field of Classification Search
CPC .............. G06F 8/60; G06F 8/61; G06F 9/445
See application file for complete search history.

(56) References Cited

U.S. PATENT DOCUMENTS 6,405,239 B1 * 6/2002 Addington .............. G06F 16/10
  709/203
9,891,907 B2 * 2/2018 Searle ..................... H04L 63/10
(Continued)

FOREIGN PATENT DOCUMENTS

CN         102520987 A      6/2012
CN         102662712 A      9/2012
(Continued)

OTHER PUBLICATIONS

Yang et al., "A Unified Platform for Data Driven Web Applications with Automatic Client-Server Partitioning", May 2007, ACM (Year: 2007).*

(Continued)

*Primary Examiner* — Wei Y Zhen
*Assistant Examiner* — Junchun Wu

(57) ABSTRACT

A method and an apparatus for downloading an installation-free application are provided. In the method, after receiving a request sent by a terminal for downloading the installation-free application, a server sends, to the terminal, information necessary for running the application, information of a home page of the application, and information about a subpage that has a highest association degree with the home page among subpages provided by the application. The server determines the foregoing association degree based on an obtained sequence of access to pages included in the application by multiple terminals. According to the method, the server does not need to send all contents of the application to the terminal at one time, to shorten an initial download time while ensuring that the terminal can normally run the application.

20 Claims, 2 Drawing Sheets

(56) References Cited

U.S. PATENT DOCUMENTS

| | | | |
|---|---|---|---|
| 10,789,315 B1* | 9/2020 | Zoller | G06F 16/34 |
| 2002/0036662 A1* | 3/2002 | Gauthier | G06F 16/951 |
| | | | 715/835 |
| 2002/0087963 A1* | 7/2002 | Eylon | H04L 67/34 |
| | | | 717/174 |
| 2003/0106025 A1* | 6/2003 | Cho | G06F 16/9577 |
| | | | 715/239 |
| 2003/0131150 A1* | 7/2003 | Sugiura | G06F 9/4411 |
| | | | 719/321 |
| 2004/0006637 A1 | 1/2004 | Kuacharoen et al. | |
| 2007/0239729 A1* | 10/2007 | Giallanza | G06F 16/954 |
| 2007/0288644 A1 | 12/2007 | Rojas et al. | |
| 2008/0235680 A1* | 9/2008 | Strauss | G06Q 30/02 |
| | | | 717/178 |
| 2009/0320017 A1* | 12/2009 | Jackson | G06F 8/61 |
| | | | 717/174 |
| 2010/0107152 A1* | 4/2010 | Kwon | G06F 8/60 |
| | | | 717/174 |
| 2010/0161787 A1* | 6/2010 | Jones | G06F 11/3476 |
| | | | 709/224 |
| 2012/0016862 A1 | 1/2012 | Rajan | |
| 2013/0125106 A1 | 5/2013 | Hanamoto | |
| 2014/0041034 A1* | 2/2014 | Li | G06F 21/561 |
| | | | 726/24 |
| 2014/0250106 A1 | 9/2014 | Shapira et al. | |
| 2014/0359601 A1* | 12/2014 | Constable | G06F 8/61 |
| | | | 717/175 |
| 2014/0359606 A1* | 12/2014 | Salameh | H04L 67/34 |
| | | | 717/178 |

FOREIGN PATENT DOCUMENTS

| | | | | |
|---|---|---|---|---|
| CN | 104360871 A | | 2/2015 | |
| CN | 105447062 A | | 3/2016 | |
| CN | 106250529 A | | 12/2016 | |
| CN | 106559484 A | | 4/2017 | |
| CN | 107704287 A | | 2/2018 | |
| CN | 107809491 A | * | 3/2018 | |
| CN | 108363528 A | * | 8/2018 | G06F 3/04842 |
| EP | 1331560 A2 | | 7/2003 | |

OTHER PUBLICATIONS

Zegura et al., "Application-Layer Anycasting: A Server Selection Architecture and Use in a Replicated Web Service", Aug. 2000, IEEE, vol. 8, No. 4 (Year: 2000).*
Kumari et al., "Distributed Data Usage Control for Web Applications: A Social Network Implementation", Feb. 2011, ACM (Year: 2011).*
Al-Ibrahim et al., "The Reality of Applying Security in Web Applications in Education", Aug. 2014, Science and Information Conference 2014 (Year: 2014).*
International Search Report dated Dec. 29, 2018, issued in PCT/CN2018/096892, total 8 pages.
Office Action issued in Chinese Application No. 201880055625.4, dated Jan. 15, 2021, total 8 pages.
Extended European Search Report issued in EP Application No. 18912441.5, dated Mar. 23, 2021, total 7 pages.
Office Action issued in IN202047037200, dated Nov. 23, 2021, 6 pages.

* cited by examiner

METHOD AND APPARATUS FOR DOWNLOADING INSTALLATION-FREE APPLICATION

CROSS-REFERENCE TO RELATED APPLICATIONS

This application is a National Stage of International Patent Application No. PCT/CN2018/096892, filed on Jul. 24, 2018, which claims priority to Chinese Patent Application No. 201810265173.4, filed on Mar. 28, 2018, both of which are incorporated herein by references in their entireties.

TECHNICAL FIELD

This application relates to the field of Internet technologies, and in particular, to a method and an apparatus for downloading an installation-free application.

BACKGROUND

With development of Internet technologies, installation-free applications become popular. The installation-free application does not require any installation processes. A user may directly download the application from a server and run the application by taping an application icon. This implements a tap-to-use operation mode, so that the user does not need to worry that too many applications are installed.

Currently, all application packages of the installation-free application usually need to be downloaded at one time. If an application package is relatively large, the download time may be relatively long, and it is difficult to implement the tap-to-use mode. Consequently, user experience is affected. To provide better operation experience for users, WeChat limits a size of an application package of an installation-free applet to 2 MB, and Google limits a maximum size of an application package of an instant app to 4 MB.

However, how to implement installation-free and tap-to-use for a relatively large application needs to be further studied.

SUMMARY

Embodiments of this application provide a method and an apparatus for downloading an installation-free application, so that a relatively large application can also meet a "tap-to-use" requirement of a user.

According to a first aspect, an embodiment of this application provides a method for downloading an installation-free application, wherein pages provided in the application includes a home page and a plurality of subpages and the method includes:

receiving, by a server, a request sent by a terminal for downloading the installation-free application, and then sending, to the terminal, information necessary for running the application, information of the home page, and information about a subpage that has a highest association degree with the home page among the plurality of subpages. The server determines the foregoing association degree based on an obtained sequence of access to pages included in the application by multiple terminals.

In the foregoing method, when receiving the request sent by the terminal for downloading an installation-free application, the server does not need to send all content of the application to the terminal at a time, but first sends the information necessary for running the application, the information of the home page, and the information about the subpage that has the highest association degree with the home page, to shorten an initial download time while ensuring that the terminal can normally run the application, to improve user experience. In addition, the subpage that has the highest association degree with the home page, that is, a page that the user is more likely to continue to access after accessing the home page is determined, and information about the subpage is sent to the terminal, to help reduce a quantity of times for which the terminal subsequently downloads the information about the subpage.

In a possible implementation, the server may determine, based on a page currently being accessed by the terminal and association degree(s) between the page currently being accessed and other page(s) of which information has not been downloaded by the terminal, information about a page that has a highest association degree with the page currently being accessed among the other pages of which information has not been downloaded by the terminal, and send the determined page information to the terminal.

In the foregoing embodiment, the server predicts a page to be subsequently accessed by the terminal, and sends, to the terminal, information about a page that is more likely to be accessed by the terminal, so that the terminal does not need to download the page again when subsequently accessing the page, thereby improving user experience.

In a possible implementation, when determining the association degree between the pages, the server determines, based on an obtained sequence of access to pages in the application by multiple terminals, that a higher probability of accessing a second page after accessing a first page by the multiple terminals indicates a higher association degree between the second page and the first page. According to the foregoing embodiment, the server may analyze habits of users to use the application based on obtained big data, and determine the association degrees between the pages based on the use habits of the users, so that when the server subsequently sends information about a page that has a high association degree with the terminal, a use requirement of the users can be better met, to help reduce cases in which a user accesses a page by using the terminal but information about the page is not downloaded.

In a possible implementation, the server may further split, based on determined association degrees between the pages, a program of the application into a main package and at least one subpackage. In this case, when sending the information necessary for running the application, the information of the home page, and the information about the subpage that has the highest association degree with the home page to the terminal, the server may send the main package to the terminal, where the main package includes the information necessary for running the application, the information of the home page, and the information about the subpage that has the highest association degree with the home page. Alternatively, the main package and a first subpackage may be sent to the terminal, where the main package includes the information necessary for running the application and the home page information of the application, and the first subpackage includes the information about the subpage that has the highest association degree with the home page. In the foregoing method, the server splits the program of the application into the main package and several subpackages, so that it helps the server send information about the pages to the terminal, and helps the server record information that has been sent to the terminal and information that has not been sent to the terminal.

In a possible implementation, the server may further send a correspondence for each of the plurality of subpages between the respective subpage and one of the at least one subpackage to the terminal. In this case, when determining that information about a to-be-accessed page requested by the user has not been downloaded, the terminal may determine, based on the correspondence for the to-be-accessed page, a second subpackage in which the information about the to-be-accessed page is located, and the terminal may send a request for downloading the second subpackage to the server.

In a possible implementation, when splitting the program of the application, the server may set a size of the main package obtained after the splitting to be less than a first preset threshold; and/or set a size of each subpackage obtained after the splitting to be less than a second preset threshold. If a package obtained after the splitting is relatively large, and a download time is relatively long, user experience may be affected. Therefore, preset thresholds are set for sizes of the main package and subpackages obtained after the splitting, to help meet a "tap-to-use" requirement of the user.

In a possible implementation, when splitting the program of the application, the server may add signature information of the server to the main package and each subpackage. In the foregoing implementation, the server adds the signature information of the server to each subpackage obtained after the splitting, so that the terminal can perform validity verification on each downloaded subpackage.

According to a second aspect, an embodiment of this application provides a server, including a processor, and a memory and a communications interface connected to the processor, where the processor is configured to read a computer program prestored in the memory to perform the following operations:

receiving, by using the communications interface, a request sent by a terminal for downloading an installation-free application, pages provided in the application including a home page and a plurality of subpages; and sending, to the terminal by using the communications interface, information necessary for running the application, information of the home page of the application, and information about a subpage that has a highest association degree with the home page among the plurality of subpages, where the server determines the association degree based on an obtained sequence of access to pages included in the application by multiple terminals.

In a possible implementation, the processor is further configured to: determine, based on a page currently accessed by the terminal and an association degree between the page currently accessed and another page, a page that is not downloaded by the terminal and that has a highest association degree with the page currently being accessed among pages of which information has not been downloaded by the terminal;

and send, by using the communications interface, information about the page determined by the processing unit to the terminal.

In a possible implementation, the processor is further configured to: determine, based on the sequence of access, that a higher probability of accessing a second page after accessing a first page by the multiple terminals indicates a higher association degree between the second page and the first page.

In a possible implementation, the processor is further configured to split, based on association degrees between the pages, a program of the application into a main package and at least one subpackage.

When sending, to the terminal by using the communications interface, the information necessary for running the application, the information of the home page, and the information about the subpage that has the highest association degree with the home page, the processor is further configured to: send the main package of the application to the terminal by using the communications interface, where the main package includes the information necessary for running the application, the home page information of the application, and the information about a subpage that has a highest association degree with the home page; or send the main package and a first subpackage of the application to the terminal by using the communications interface, where the main package includes the information necessary for running the application and the home page information of the application, and the first subpackage includes the information about a subpage that has a highest association degree with the home page.

In a possible implementation, the processor is further configured to: send a correspondence for each of the plurality of subpages between the respective subpage and one of the at least one subpackage to the terminal by using the communications interface; receive a request sent by the terminal for downloading a second subpackage by using the communications interface, where when determining that information about a to-be-accessed page is not downloaded, the terminal determines, based on the correspondence for the to-be-accessed page, the second subpackage in which the information about the to-be-accessed page is located; and send the second subpackage to the terminal by using the communications interface.

In a possible implementation, a size of the main package is less than a first preset threshold; and/or a size of each subpackage is less than a second preset threshold.

In a possible implementation, both the main package and each subpackage include signature information of the server.

According to a third aspect, an embodiment of this application further provides a computer storage medium. The storage medium stores a software program. When read and executed by one or more processors, the software program can implement the method according to any one of the first aspect or the designs of the first aspect.

DESCRIPTION OF EMBODIMENTS

The embodiments of this application are further described in detail below with reference to the accompanying drawings.

An installation-free application may not require any installation processes. After downloading a program package, a terminal can directly run the program package, to facilitate user operations. In addition, another installation-free application, such as a WeChat mini program, may be loaded into one application. For example, a user may tap an icon of an installation-free application B in an application A, and the terminal loads a program package of the application B and runs the program package. Because the program package of the application B is relatively small, the program package can be quickly downloaded, and an installation process is omitted, so that the user can quickly use the application B, to achieve a tap-to-use effect. After the user disables the application B, the terminal may automatically release a resource occupied by the application B, to avoid occupying storage space of the terminal for a long time. Therefore, the user does not need to worry that the storage space of the terminal is insufficient after downloading and installing a large quantity of applications.

The installation-free application can provide better user experience for the user, but also has some limitations. Currently, when a program package of an installation-free application is downloaded, the program package is generally downloaded at one time. To achieve a tap-to-use effect, the program package of the installation-free application cannot be excessively large. Otherwise, user experience is affected due to an excessively long download time. An application or a platform that provides an installation-free application usually limits a size of a program package of the installation-free application to 2 MB, 4 MB, or the like.

However, for some applications with a plurality of functional pages, it is usually difficult to control sizes of the packages within a relatively small range. To implement that a relatively large application can also meet a "tap-to-use" requirement of the user, the embodiments of this application provide a method for downloading an installation-free application.

Figure 1:
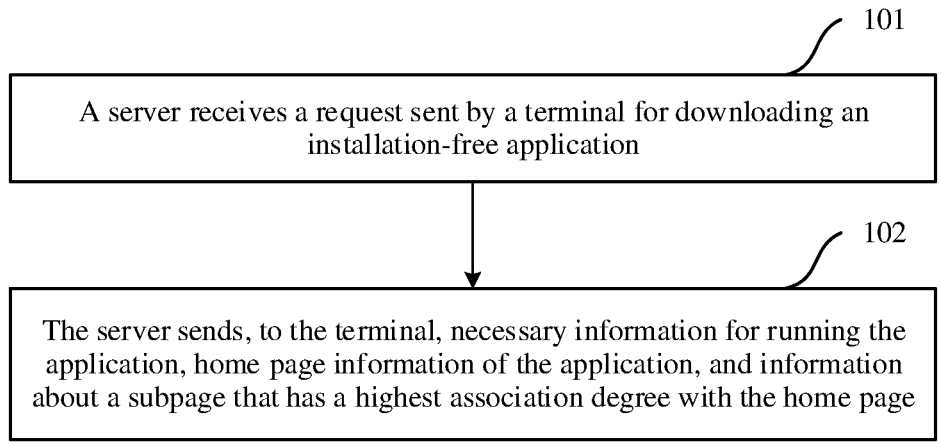
FIG. 1 is a schematic flowchart 1 of a method for downloading an installation-free application according to an embodiment of this application.

FIG. 1 is a schematic flowchart 1 of a method for downloading an installation-free application according to an embodiment of this application. As shown in the figure, the method may include the following steps.

Step 101: A server receives a request sent by a terminal for downloading an installation-free application.

When a user intends to use an installation-free application, for example, the user taps an icon of the installation-free application, the terminal sends a request for downloading the installation-free application to the server.

Step 102: The server sends, to the terminal, information necessary for running the application, home page information of the application, and information about a subpage that has a highest association degree with the home page among subpages provided by the application.

Specifically, the foregoing association degree is obtained by the server based on an obtained sequence of access to pages included in the application by multiple terminals.

The information necessary for running the application may be information that needs to be obtained provided that the application is run, regardless of which pages in the application are requested to be accessed by the terminal. For example, the information is an application name, an icon, a global application variable, or the like.

An application may usually include a plurality of pages. After the user chooses to open an application, a page first displayed to the user is a home page, and another page is a subpage. For example, the terminal runs a shopping application, and a page first displayed to the user is a home page. The home page may include display information of a commodity recommended to the user, user information, and the like. The user can tap an identifier of "My Information" to enter the "My Information" page, and the page is a subpage. After entering the "My Information" page, the user taps an identifier of "Member Information" to enter the "Member Information" page, and the page is also a subpage. For another example, a game application may include a home page used to display game information, and may further include a battle game subpage, a standalone game subpage, a performance ranking subpage, and the like.

For an installation-free application, the server may obtain in advance a sequence of access to pages in the application by multiple terminals, that is, obtain habits of users, and determine association degrees between the pages. Optionally, if the server determines that a probability that the multiple terminals access a page 2 after accessing a page 1 is higher than a probability that the multiple terminals access another page after accessing a page 1, it is considered that an association degree between the page 1 and the page 2 is higher than the association degree between page 1 and the other page. For example, in a shopping application, the server may obtain operation information of multiple terminals, and determine that after the terminals access a "My" page, 50% of the terminals continue to access a "My Favorites" page, and 10% of the terminals access a "My Order" page. In this case, the server determines that an association degree between the "My" page and the "My Favorites" page is higher than an association degree between the "My" and the "My Order". For another example, in a game application, the server determines, based on operation information of multiple terminals, that after the terminals open a home page of the application, 60% of the terminals access a "Real-time Battle" page to perform a game battle with another user, 30% of the terminals access a "Standalone Mode" page, and 10% of terminals access a "Performance Ranking" page to view the rankings. In this case, the server determines that the home page of the game application has a highest association degree with the "Real-time Battle" page, a second highest association degree with the "Standalone Mode" page, and a lowest association degree with the "Performance Ranking" page.

Information that is about the sequence of access to the pages in the application by the terminals and that is obtained by the server may be obtained from the terminals, may be sent by another device to the server, or may be manually entered into the server. For example, the terminal may periodically report information about a page accessed by the terminal after the application is opened, or may report the information about the accessed page to the server after each page is accessed in a timely manner. For another example, the server may send, to the terminal, an instruction for reporting page access information, and the terminal periodically or in real time reports, based on the instruction, the information about the page accessed by the terminal. For another example, another server may alternatively execute a task of collecting a sequence of access to pages by multiple terminals, and then send a statistical result to a server that provides a service for downloading the installation-free application.

In addition, when the information about the sequence of access to the pages in the application is obtained, page access information of multiple terminals may be obtained, and page access information of a same terminal when the application is used for a plurality of times may also be obtained. Because even if a same user opens an installation-free application for a plurality of times via a same terminal, sequences of access to the pages may be different.

In a possible implementation, after determining association degrees between pages in an application, the server may further split a program of the application into a main package and at least one subpackage.

The main package includes information necessary for running the application and home page information of the application, that is, information about a page that is first entered by the user after the user opens the application. Further, in addition to the information necessary for running the application and the home page information of the application, the main package may further include information about a subpage that has a highest association degree with the home page among subpages provided by the application, so that after the terminal downloads the main package and runs the application to access the home page, information about pages that are more likely to be accessed is also included in the main package, so that the terminal does not need to download the pages for a plurality of times. In addition, the main package may further include information such as a version number of the application and a system environment supported by the application.

The subpackage may include information about at least one subpage, and the information included in the subpackage may be unnecessary information for running the application. For example, when the terminal runs a shopping application, information about a "Completed Order" page is not necessary information for running the application. In addition, considering that there is a relatively low probability that the user immediately enters the "Completed Order" page after opening the application, the server may pack the information about the "Completed Order" page into the subpackage.

The page information included in the main package or the subpackage may be an address of a page, for example, a uniform resource locator (URL) of the page.

The server splits the program package based on the determined association degree between the pages, so that the main package and subpackage obtained after the splitting better meet a user requirement. For example, the server determines that in a game application, a home page has a highest association degree with a "Real-time Battle" page, a second highest association degree with a "Standalone Mode" page, and a lowest association degree with a "My Performance" page. The server may put, based on the determined association degrees, information about the home page and the "Real-time Battle" page into the main package, and put information about the "Standalone Mode" page and the "My Performance" page into the subpackage. In a process of downloading the application, the terminal first downloads the main package, so that the terminal can smoothly run the home page of the application. Because the user is more likely to choose to enter the "Real-time Battle" page, the information about the "Real-time Battle" page and the home page is packed into the main package, so that the user can directly enter the "Real-time Battle" page without downloading another subpackage, thereby further improving user experience. Because the user is less likely to choose to enter the "Standalone Mode" page and the "My Performance" page, the "Standalone Mode" page and the "My Performance" page are packed into a subpackage, and the subpackage may be sent to the terminal upon request by the user.

If the server splits the application, correspondingly, in the foregoing step 102, the server may send the main package (including the information necessary for running the application, the home page information, and the information about a subpage that has a highest association degree with the home page among subpages provided by the application) to the terminal; or send the main package (including the information necessary for running the application and the home page information) and a subpackage including the information about a subpage that has a highest association degree with the home page among the subpages provided by the application to the terminal.

In addition, to further meet the user requirements of quick downloading and tap-to-use, when splitting the program package of the application, the server may further limit sizes of the main package and subpackage obtained after the splitting. For example, a size of the main package obtained after the splitting is less than a first preset threshold, and a size of the subpackage is less than a second preset threshold. For example, the size of the main package cannot exceed 4 MB, and the size of the subpackage cannot exceed 2 MB. Certainly, the first preset threshold may be the same as the second preset threshold. In determining the first preset threshold and the second preset threshold, a download rate of a common network, a download time acceptable to a user, and/or the like may be taken into consideration. In addition, a factor that a size of an application package limited by a platform providing an installation-free application, or the like may be taken into consideration in determining the first and second preset thresholds.

The application package provided by the server for the terminal usually includes signature information added by the server, to prevent the program package from being illegally tampered with. However, in the foregoing embodiments, because the server splits the program package into the main package and the at least one subpackage, to prevent each main package or subpackage from being tampered with, the server may add the signature information of the server to each package obtained after the splitting, to ensure security and validity of each package obtained after the splitting.

In a possible implementation, when splitting the program package, the server may further generate a correspondence between a page and a subpackage. For example, if the server packs information about a "Shopping Cart" page (page 1) in a shopping application into a subpackage 1, packs information about a "Completed Order" page (page 2) into a subpackage 2, and packs information about a "My Favorites" page (page 3) into a subpackage 3, the server determines that the page 1 corresponds to the subpackage 1, the page 2 corresponds to the subpackage 2, and the page 3 corresponds to the subpackage 3. When the user intends to access the page 1, and the program package downloaded by the terminal does not include information about the page 1, the terminal may send a request for accessing the page 1 to the server, and the server may send the subpackage 1 to the terminal based on the correspondence between the page 1 and the subpackage 1. Usually, because the home page information is added to the main package and sent to the terminal, page information subsequently requested and obtained by the terminal is not the home page information. Therefore, the correspondence that is between a page and a subpackage and that is generated by the server is usually a correspondence between a subpage and a subpackage. In addition, if the main package further includes information about one or more subpages that have association degree(s) with the home page, the foregoing correspondence may not include corresponding information of the subpages included in the main package. Certainly, the foregoing correspondence may alternatively include a correspondence between the home page and the main package, and may further include a correspondence between the subpage included in the main package and the main package. This is not limited in embodiments of the present disclosure.

Further, the server may further send a correspondence between each page and a subpackage to the terminal. In this case, when the terminal determines that information about a to-be-accessed page requested by the user has not been downloaded, the terminal may determine, based on the correspondence, the subpackage in which the information about the to-be-accessed page is located, and send a request for downloading the subpackage to the server. For example, after the user operates the terminal to open an application A, if the user intends to access a page 2 in the application A, but information about the page 2 is not downloaded, the terminal determines, based on a correspondence between the page 2 and a subpackage 2 included in a downloaded main package, that the page 2 corresponds to the subpackage 2. Then, a request for downloading the subpackage 2 is sent to the server.

In the process of obtaining the subpackage by the terminal, the terminal determines whether the subpackage needs to be downloaded after receiving an instruction for accessing the page by the user. However, in another possible implementation, the terminal may also actively send a request for downloading a subpackage to the server when there is no download task or there are a relatively small quantity of download tasks. For example, after the terminal downloads main package of the application A and runs the application A, the user is browsing content displayed on a home page of an application B. In this case, the terminal may not have an ongoing download task, or the terminal only needs to download a small amount of information to update the content displayed on the home page. In this case, the terminal may actively send a request for obtaining a subpackage to the server, to download the subpackage of the application without affecting current operation experience of the user, thereby helping accelerate the speed of subsequently opening another page by the user, and improving user experience.

In addition, the server may also actively send the subpackage(s) of the application to the terminal. For example, the terminal downloads a main package of a game application B. If the user is currently playing a game and because the terminal may need to download real-time information in the game, the server may send, to the terminal in a non-game period, another subpackage of the application, for example, a subpackage in which information of a "Performance Ranking" page is located.

Further, the server may further send the subpackage of the application to the terminal based on the page currently running on the terminal and the determined association degree between the pages. For example, if the terminal is currently running a page 1, the server determines, based on association degrees between the pages, that association degrees with the page 1 are sequentially a page 2, a page 3, a page 4, and the like in descending order. Information about the page 2 and the page 1 is packed into a subpackage 1, and information about the page 3 and the page 4 is packed in a subpackage 2. The terminal has downloaded the subpackage 1. Therefore, the server may send the subpackage 2 that has not yet been downloaded by the terminal to the terminal.

Certainly, if the server does not unpack the program of the application, the server may determine, in pages on which the terminal currently has not downloaded corresponding information, information about a page that has a highest association degree with the page currently being accessed by the terminal among pages of which information has not been downloaded, and send the information to the terminal.

In this embodiment of this application, after receiving the request for downloading the installation-free application, the server does not send all contents of the application to the terminal at a time, but first sends the information necessary for running the application and the home page information, to shorten an initial download time while ensuring that the terminal can normally run the application, to achieve a tap-to-use effect. In addition, because the server further sends, to the terminal, the information about a subpage that has a highest association degree with the home page among subpages provided by the application, that is, sends, to the terminal, information about a page that the terminal is more likely to continue to access, to help reduce a quantity of times for which the terminal subsequently downloads the information about the subpage.

An example is described below for a clear understanding of the embodiments of this application.

A server receives a program package that is of an installation-free application A and that is uploaded by a developer. Because a size of the program package of the application A exceeds a threshold, the server performs initial splitting on the application A. Because the server does not obtain operation information of the user about the application A during this splitting, the server cannot analyze an association degree between pages in the application A, so that the server may perform only simple splitting, to ensure that sizes of a main package and each subpackage obtained after the splitting do not exceed a preset threshold. After the application A is downloaded and used by a plurality of users, the server obtains operation information of the users from the terminal, that is, sequence of access to pages by the terminals, analyzes the association degrees between the pages in the application A, and re-splits the program package of the application A based on the association degree. The main package and subpackage that are obtained after the splitting based on the association degrees between the pages better meet operation requirements of the users, thereby helping reduce a quantity of times for downloading the subpackage.

Figure 2:
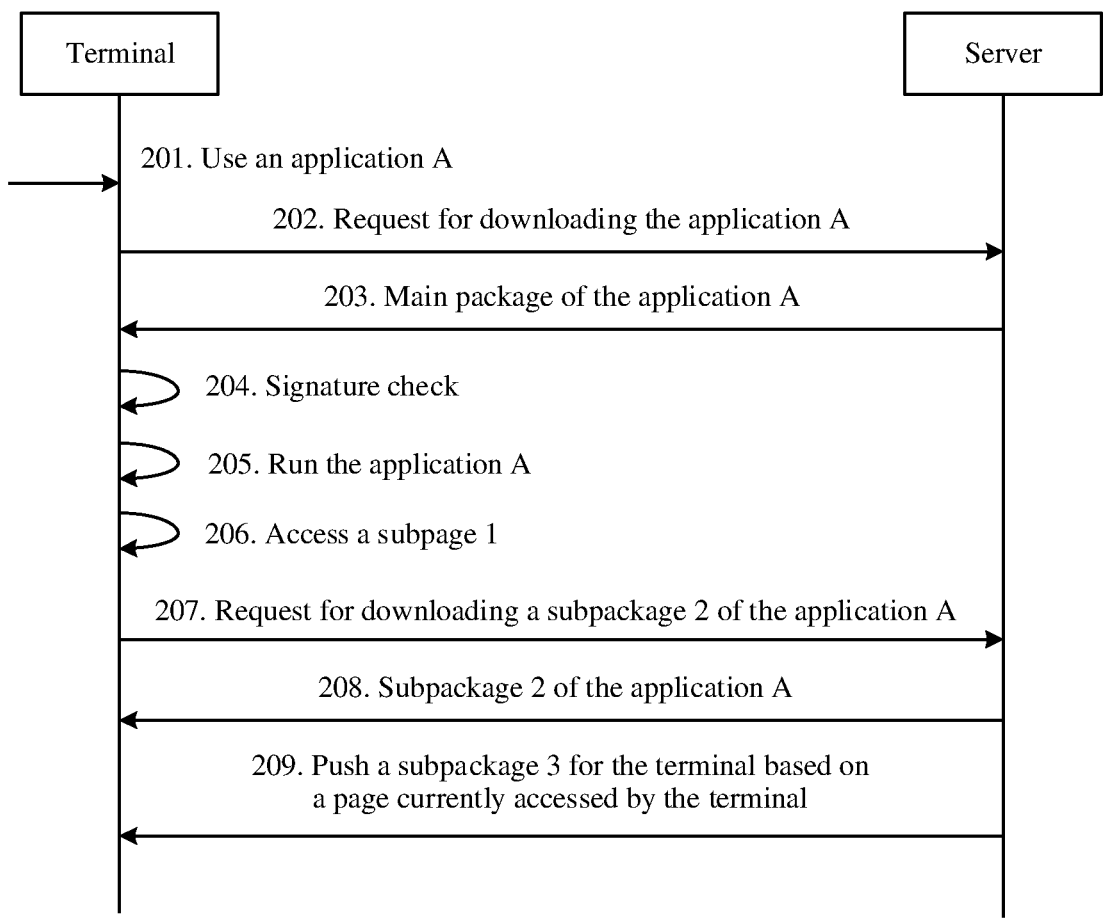
FIG. 2 is a schematic flowchart 2 of a method for downloading an installation-free application according to an embodiment of this application.
Figure 3:
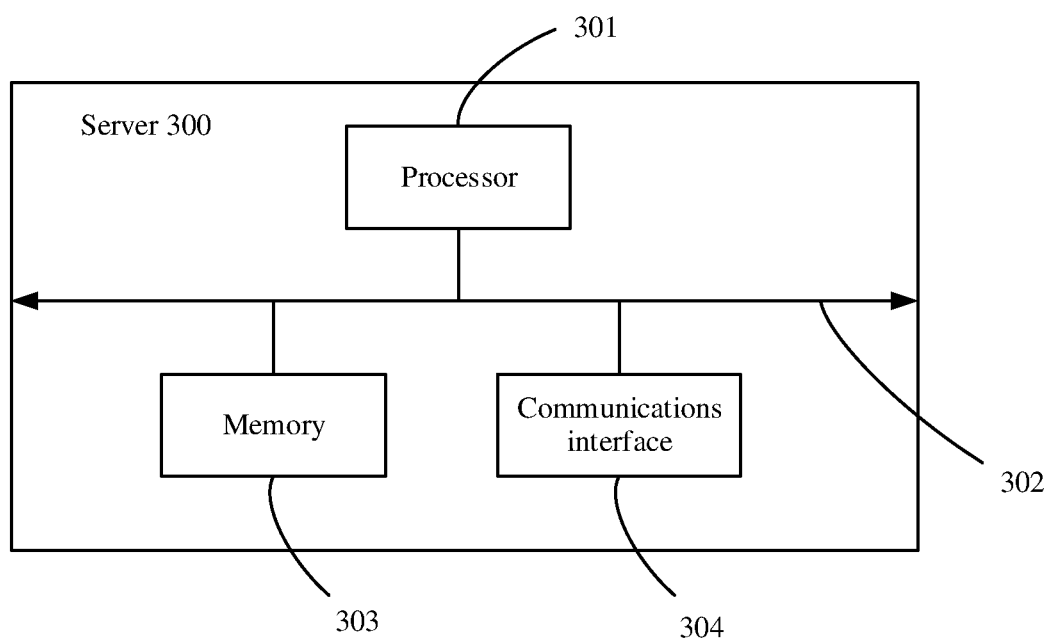
FIG. 3 is a schematic structural diagram 1 of a server according to an embodiment of this application.

After the server intelligently splits the program package of the application A based on the association degrees between the pages, an interaction process between the terminal and the server may be shown in FIG. 2.

Step 201: The terminal receives an instruction of a user for using an installation-free application A.

Step 202: The terminal sends a request for downloading the application A to the server.

Step 203: The server sends a main package of the application A to the terminal, where the main package may include information shown in Table 1.

TABLE 1

| Name | Description |
|---|---|
| Identifier of an program package | Unique identifier of a program package of the application A |
| Application name | Name of the application A, which can be displayed in a desktop icon or pop-up window |
| Icon | Icon of the application A |
| Version number | Version number of the application A |
| url of a home page | url for accessing the home page of the application A |
| url of a subpage 1 | url for accessing the subpage 1 of the application A, where the subpage 1 has a highest association degree with the home page among subpages provided by the application |
| Correspondence | Correspondence between pages and subpackages in the application A |

TABLE 1-continued

| Name | Description |
| --- | --- |
| Signature | Signature information added by the server, which is used for validity check |

The correspondence may be shown in Table 2.

TABLE 2

| Page | Subpackage |
| --- | --- |
| Subpage 2 | Subpackage 1 |
| Subpage 3 | Subpackage 2 |
| Subpage 4 | Subpackage 2 |
| Subpage 5 | Subpackage 3 |
| . . . | . . . |

Step 204: After receiving the main package, the terminal performs validity check based on the signature information. If the check succeeds, step 205 is performed. If the check fails, the process ends.

Step 205: The terminal runs the application A based on the main package.

Step 206: The terminal receives an instruction for accessing the subpage 1, and accesses the subpage 1 based on the url of the subpage 1 included in the main package.

Step 207: The terminal receives an instruction for accessing the subpage 3, and the terminal determines that the downloaded main package does not include information about the subpage 3, and determines, based on a correspondence between the subpage 3 and a subpackage 2, that the information about the subpage 3 is included in the subpackage 2, so that the terminal sends a request for downloading the subpackage 2 to the server.

Step 208: The server sends the subpackage 2 to the terminal.

In an alternative embodiment, at Step 209: The server learns that the terminal is currently accessing the subpage 3, and determines, based on association degrees between the pages, that association degrees with the subpage 3 are sequentially the subpage 4, the subpage 5, and the like in descending order, and the subpackage 2 in which information about the page 4 is located has already been sent to the terminal. However, the subpackage 3 in which information about the page 5 is located has not yet been sent to the terminal, so that the server sends the subpackage 3 to the terminal.

In the foregoing embodiments of this application, the application package is intelligently split, to help shorten a waiting time when the terminal downloads the application, thereby achieving "tap-to-use" experience of the user. In addition, because an operation habit of the user is considered when the program package is unpacked, the main package and the subpackage that are obtained after the unpacking better satisfy the use habit of the user, thereby helping reduce a quantity of times of downloading the subpackage by the terminal.

Figure 4:
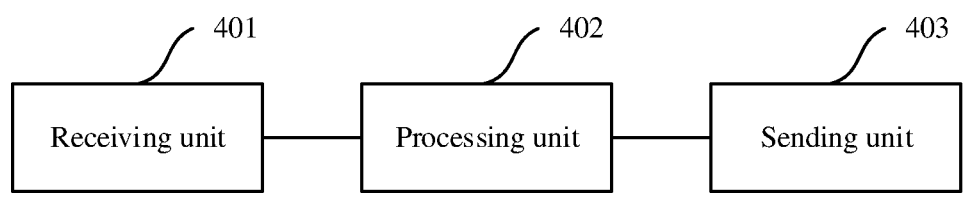
FIG. 4 is a schematic structural diagram 2 of a server according to an embodiment of this application.

An embodiment of this application further provides a server, configured to perform functions of the server in the foregoing method embodiments. FIG. 4 is a schematic structural diagram of a server 300 according to an embodiment of this application. As shown in the figure, the server may include at least one processor 301, a communications bus 302, a memory 303, and at least one communications interface 304.

The at least one processor 301 is configured to read a computer program prestored in the memory 303 to perform the following operations:

receiving, by using the at least one communications interface 304, a request sent by a terminal for downloading an installation-free application; and sending, to the terminal by using the at least one communications interface 304, information necessary for running the application, home page information of the application, and information about a subpage that has a highest association degree with the home page among subpages provided by the application, where the server determines the association degree based on an obtained sequence of access to pages included in the application by multiple terminals.

In a possible implementation, the at least one processor 301 is further configured to: determine, based on a page currently being accessed by the terminal and an association degree between the page currently being accessed and another page that has a highest association degree with the page currently being accessed among pages of which information has not been downloaded; and send, by using the at least one communications interface 304, information about the page determined by the at least one processor 301 to the terminal.

In a possible implementation, the at least one processor 301 is further configured to: determine, based on the sequence of access, that a higher probability of accessing a second page after accessing a first page by multiple terminals indicates a higher association degree between the second page and the first page.

In a possible implementation, the at least one processor 301 is further configured to split, based on association degrees between the pages, a program of the application into a main package and at least one subpackage. When sending, to the terminal by using the at least one communications interface 304, the information necessary for running the application, the home page information of the application, and the information about a subpage that has a highest association degree with the main page among subpages provided by the application, the at least one processor 301 is further configured to: send the main package of the application to the terminal by using the at least one communications interface 304, where the main package includes the information necessary for running the application, the home page information of the application, and the information about a subpage that has a highest association degree with the home page among subpages provided by the application; or send the main package and a first subpackage of the application to the terminal by using the at least one communications interface 304, where the main package includes the information necessary for running the application and the home page information of the application, and the first subpackage includes the information about a subpage that has a highest association degree with the home page among subpages provided by the application.

In a possible implementation, the at least one processor 301 is further configured to: send a correspondence between each page and at least one subpackage to the terminal by using the at least one communications interface 304; receive a request sent by the terminal for downloading a second subpackage by using the at least one communications interface 304, where when determining that information about a to-be-accessed page has not been downloaded, the terminal determines, based on the correspondence, the second subpackage in which the information about the to-be-accessed page is located; and send the second subpackage to the terminal by using the at least one communications interface 304.

In a possible implementation, a size of the main package is less than a first preset threshold; and/or a size of each subpackage is less than a second preset threshold.

In a possible implementation, both the main package and each subpackage include signature information of the server.

The at least one processor 301 may be a general-purpose central processing unit (CPU), a microprocessor, an application-specific integrated circuit (ASIC), or one or more integrated circuits configured to control program execution of the solutions in embodiments of this application.

The communications bus 302 may include a path for transmitting information between the foregoing components.

The at least one communications interface 304 uses any apparatus of a transceiver type, to communicate with another device or a communications network, for example, Ethernet, a radio access network (RAN), or a wireless local area network (WLAN).

The memory 303 may be a read-only memory (ROM) or another type of static storage device that can store static information and one or more instructions; or a random access memory (RAM) or another type of dynamic storage device that can store information and one or more instructions; or may be an electrically erasable programmable read-only memory (EEPROM), a compact disc read-only memory (CD-ROM) or another compact disc storage medium, optical disc storage medium (including a compact disc, a laser disc, an optical disc, a digital versatile disc, a Blu-ray disc, or the like) and magnetic disk storage medium, another magnetic storage device, or any other medium that can be configured to carry or store expected program code in a form of one or more instructions or a data structure and that is accessible by a computer, but is not limited thereto. The memory 303 may exist independently, and is connected to the processor through the bus. The memory 303 may be integrated with the at least one processor 301.

The memory 303 is configured to store application code for performing the solutions in this application, and the at least one processor 301 controls the performing. The at least one processor 301 is configured to execute the application code stored in the memory 303, to implement the method for downloading an installation-free application in the embodiments of this application.

Alternatively, in the embodiments of this application, the at least one processor 301 may alternatively execute related functions in the method for downloading an installation-free application in the embodiments of this application, and the at least one communications interface 304 is responsible for communicating with another device or communications network. This is not specifically limited in the embodiments of the present disclosure.

In an embodiment, the at least one processor 301 may include one or more CPUs.

In an embodiment, the server may include a plurality of processors. Each of the processors may be a single-core (single-CPU) processor or a multi-core (multi-CPU) processor. The processor herein may be one or more devices, circuits, and/or processing cores for processing data (for example, a computer program instruction).

An embodiment of this application further provides a server, configured to perform functions of the server in the foregoing method embodiments. FIG. 4 is a schematic structural diagram of a server according to an embodiment of this application. As shown in the figure, the server may include a receiving unit 401, a processing unit 402, and a sending unit 403. The receiving unit 401 and the sending unit 403 may be configured to implement functions implemented by the at least one communications interface in the foregoing embodiments, and the processing unit 402 may be configured to implement functions implemented by the foregoing at least one processor 301.

An embodiment of this application further provides a computer storage medium. The storage medium stores a software program. When read and executed by one or more processors, the software program may implement the method for downloading an installation-free application.

Apparently, a person skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A method for downloading an installation-free application, comprising:
   receiving, by a server, a request from a terminal for downloading the installation-free application, pages provided in the application including a home page and a plurality of subpages; and
   sending, by the server to the terminal, information necessary for running the application, information of the home page, and information about a subpage that has a highest association degree with the home page among the plurality of subpages, wherein
   the highest association degree is determined by the server based on an obtained sequence of access to the pages provided in the application by multiple terminals;
   a program of the application comprises a main package and at least one subpackage; and
   the sending the information necessary for running the application, the information of the home page, and the information about the subpage that has the highest association degree with the home page comprises:
   sending, by the server, the main package of the application to the terminal, wherein the main package comprises the information necessary for running the application, the information of the home page, and the information about the subpage that has the highest association degree with the home page.

2. The method according to claim 1, further comprising:
   determining, by the server, based on a page currently being accessed by the terminal and an association degree between the page currently being accessed and another page that has a highest association degree with the page currently being accessed among pages of which information has not been downloaded by the terminal; and
   sending, by the server, information about the determined another page to the terminal.

3. The method according to claim 1, wherein
   the determination of the highest association degree based on the obtained sequence of access comprises: determining, by the server based on the obtained sequence of access, that a higher probability of accessing a subpage after accessing the home page by the multiple terminals indicates a higher association degree between the subpage and the home page.

4. The method according to claim 1, further comprising:
   splitting, by the server, based on association degrees between the pages provided in the application, the program of the application into the main package and the at least one subpackage.

5. The method according to claim 4, further comprising:
sending, by the server, a correspondence for each of the plurality of subpages between the respective subpage and one of the at least one subpackage to the terminal;
receiving, by the server, a request sent by the terminal for downloading a subpackage in which information about a to-be-accessed page is located, wherein when the information about the to-be-accessed page has not been downloaded from the server to the terminal, the subpackage is determined by the terminal based on the correspondence for the to-be-accessed page; and
sending, by the server, the subpackage to the terminal.

6. The method according to claim 4, wherein a size of the main package is less than a first threshold; or
a size of each subpackage is less than a second threshold; or
a size of the main package is less than the first threshold and a size of each subpackage is less than the second threshold.

7. The method according to claim 4, wherein both the main package and each subpackage comprise signature information of the server.

8. The method according to claim 1, further comprising:
splitting, by the server based on association degrees between the pages provided in the application, the program of the application into the main package and the at least one subpackage,
wherein the sending information necessary for running the application, the information of the home page, and the information about the subpage that has the highest association degree with the home page comprises:
sending, by the server, the main package and one of the at least one subpackage of the application to the terminal, wherein the main package comprises the information necessary for running the application and the information of the home page, and the one of the at least one subpackage comprises the information about the subpage that has the highest association degree with the home page.

9. The method according to claim 1, wherein obtaining the sequence of access to the pages provided in the installation-free application comprises:
periodically receiving from one of the multiple terminals information about one or more pages, of the pages provided in the installation-free application, that have been accessed by the terminal within a period.

10. The method according to claim 1, wherein obtaining the sequence of access to the pages provided in the installation-free application comprises:
receiving from each of the multiple terminals access information about any of the pages provided by the installation-free application whenever the page is accessed by the terminal.

11. The method according to claim 1, further comprising:
transmitting, by the server, to each of the multiple terminals, an instruction instructing the terminal to report access information regarding the pages provided in the installation-free application.

12. A server, comprising at least one processor, and a memory and a communications interface connected to the at least one processor, wherein the memory comprises computer program that, when executed by the at least one processor, cause the server to perform functions comprising:
receiving a request sent by a terminal for downloading an installation-free application, pages provided in the application including a home page and a plurality of subpages; and
sending, to the terminal, information necessary for running the application, information of the home page, and information about a subpage that has a highest association degree with the home page among the plurality of subpages, wherein
the highest association degree is determined by the server based on an obtained sequence of access to the pages provided in the application by multiple terminals;
a program of the application comprises a main package and at least one subpackage; and
the sending the information necessary for running the application, the information of the home page, and the information about the subpage that has the highest association degree with the home page comprises:
sending, by the server, the main package of the application to the terminal, wherein the main package comprises the information necessary for running the application, the information of the home page, and the information about the subpage that has the highest association degree with the home page.

13. The server according to claim 12, wherein the functions further comprise:
determining, based on a page currently being accessed by the terminal and an association degree between the page currently being accessed and another page that has a highest association degree with the page currently being accessed among pages of which information has not been downloaded by the terminal; and
sending information about the determined another page to the terminal.

14. The server according to claim 12, wherein the determination of the highest association degree based on the obtained sequence of access comprises:
determining, based on the obtained sequence of access, that a higher probability of accessing a second page after accessing a first page by the multiple terminals indicates a higher association degree between the second page and the first page.

15. The server according to claim 12, wherein the functions further comprise:
splitting, based on association degrees between the pages provided in the application, the program of the application into the main package and the at least one subpackage.

16. The server according to claim 15, wherein the functions further comprise:
sending a correspondence for each of the plurality of subpages between the respective subpage and one of the at least one subpackage to the terminal;
receiving a request sent by the terminal for downloading a subpackage in which information about a to-be-accessed page is located, wherein when the information about the to-be-accessed page has not been downloaded from the server to the terminal, the subpackage is determined by the terminal based on the correspondence for the to-be-accessed page; and
sending the subpackage to the terminal.

17. The server according to claim 15, wherein a size of the main package is less than a first threshold;
- a size of each of the at least one subpackage is less than a second threshold; or
- a size of the main package is less than the first threshold and a size of each of the at least one subpackage is less than the second threshold.

18. The server according to claim 15, wherein both the main package and each subpackage comprise signature information of the server.

19. The server according to claim 12, the functions further comprise:
- splitting, based on association degrees between the pages provided in the application, the program of the application into the main package and the at least one subpackage,
- wherein the sending the information necessary for running the application, the information of the home page, and the information about the subpage that has the highest association degree with the home page comprises:
- sending the main package and one of the at least one subpackage of the application to the terminal, wherein the main package comprises the information necessary for running the application and the information of the home page, and the one of the at least one subpackage comprises the information about the subpage that has the highest association degree with the home page.

20. A non-statutory computer readable medium comprises computer program that, when executed by an apparatus, causing the apparatus to perform:
- receiving a request sent by a terminal for downloading an installation-free application, pages provided in the installation-free application including a home page and a plurality of subpages; and
- sending information necessary for running the application, information about the home page, and information about a subpage that has a highest association degree with the home page among the plurality of subpages, wherein the highest association degree is determined based on an obtained sequence of access to the pages provided in the application by multiple terminals;
- a program of the application comprises a main package and at least one subpackage; and
- the sending the information necessary for running the application, the information of the home page, and the information about the subpage that has the highest association degree with the home page comprises:
- sending, by the apparatus, the main package of the application to the terminal, wherein the main package comprises the information necessary for running the application, the information of the home page, and the information about the subpage that has the highest association degree with the home page.

* * * * *